US012534346B2

(12) United States Patent
Zhao

(10) Patent No.: US 12,534,346 B2
(45) Date of Patent: Jan. 27, 2026

(54) JACKING TOOL CAPABLE OF ACHIEVING UP-DOWN FINE ADJUSTMENT

(71) Applicant: Mingduo Zhao, Yongkang (CN)

(72) Inventor: Mingduo Zhao, Yongkang (CN)

( * ) Notice: Subject to any disclaimer, the term of this patent is extended or adjusted under 35 U.S.C. 154(b) by 0 days.

(21) Appl. No.: 19/083,670

(22) Filed: Mar. 19, 2025

(65) Prior Publication Data

US 2025/0214815 A1 Jul. 3, 2025

(30) Foreign Application Priority Data

Jul. 22, 2024 (CN) ......................... 202410984607.1

(51) Int. Cl.

*B66F 1/02* (2006.01)
*B66F 1/00* (2006.01)
*B05C 17/01* (2006.01)
*B25B 5/06* (2006.01)
*B66F 3/00* (2006.01)

(52) U.S. Cl.

CPC ............ *B66F 1/02* (2013.01); *B05C 17/0123* (2013.01); *B25B 5/068* (2013.01); *B66F 1/00* (2013.01); *B66F 3/00* (2013.01)

(58) Field of Classification Search

CPC ...... B66F 1/02; B66F 1/00; B66F 3/00; B25F 1/00; B05C 17/0123; B25B 5/068; B25B 5/163; B25B 5/166
USPC ..................................................... 254/105, 1
See application file for complete search history.

(56) References Cited

U.S. PATENT DOCUMENTS

| | | | | |
|---|---|---|---|---|
| 2014/0319437 A1* | 10/2014 | Plummer | ................ | E05C 17/54 254/105 |
| 2015/0078815 A1 | 3/2015 | Ge et al. | | |
| 2016/0288161 A1* | 10/2016 | Yi | ....................... | B05C 17/0123 |
| 2019/0300345 A1 | 10/2019 | Barner et al. | | |
| 2022/0203511 A1 | 6/2022 | Resch | | |

FOREIGN PATENT DOCUMENTS

| | | | | |
|---|---|---|---|---|
| CA | 2849831 A1 * | 10/2014 | ............ | E05C 17/54 |
| CN | 207959984 U * | 10/2018 | | |
| CN | 209754992 U * | 12/2019 | | |
| DE | 10127718 A1 * | 12/2002 | ................ | B66F 1/02 |
| WO | WO-2023076123 A1 * | 5/2023 | ................ | B66F 1/02 |
| WO | WO-2024132479 A1 * | 6/2024 | ................ | B66F 1/02 |

* cited by examiner

*Primary Examiner* — Mahdi H Nejad
(74) *Attorney, Agent, or Firm* — Zhigang Ma

(57) ABSTRACT

A jacking tool capable of achieving up-down fine adjustment is provided, and belongs to the technical field of jacking tools. The jacking tool includes a fixed portion and a lifting portion; the fixed portion includes a base and a guide rod arranged on the base; the lifting portion is provided with a lifting plate, a climbing mechanism, and an adjustment grip for controlling the climbing mechanism; the adjustment grip is pressed to actuate the climbing mechanism, to control the lifting portion and the lifting plate to move up along the guide rod; the lifting portion is further provided with a locking mechanism clamped to the guide rod; the locking mechanism restricts the lifting portion from moving down; the lifting plate is slidably arranged on the lifting portion.

9 Claims, 15 Drawing Sheets

JACKING TOOL CAPABLE OF ACHIEVING UP-DOWN FINE ADJUSTMENT

TECHNICAL FIELD

The present disclosure belongs to the technical field of jacking tools, and in particular, to a jacking tool capable of achieving up-down fine adjustment.

BACKGROUND

During interior decoration and exterior decoration of a building, it is often necessary to jack up burglarproof doors, wall bricks, and other operation objects to a height, and then the operation objects are fixedly mounted. At present, various types of jacking tools have appeared on the market to help people fix operation objects during operation, so that it is more convenient and accurate for people to install the burglarproof doors, the wall bricks, and other objects.

Chinese patent No. CN202322485531.1 provides a finely-adjustable jacking tool, which includes a fixed portion and a lifting portion arranged at the fixed portion. The fixed portion includes a base and a guide rod arranged on the base. The lifting portion is provided with a lifting plate, a climbing mechanism, and an adjustment grip for controlling the climbing mechanism. The lifting portion is further provided with a locking mechanism that is clamped with the guide rod. The locking mechanism is provided with a fine adjustment sheet, one end of which resists against the lifting portion, and the other end of which is hinged with an adjustment sheet. The adjustment sheet is provided with an adjustment rod resisting against an upper surface of the locking mechanism. The above jacking tool can only achieve downward fine adjustment of a jacking height on an item in one direction by pressing the adjustment sheet, so that the function is single. When the jacking height of the item is slightly less than an desired height, a user needs to press the adjustment grip again to move the item up a distance, and then presses the adjustment sheet to achieve downward fine adjustment on the item, so that the jacking height of the item reaches a corresponding position. The operation steps are numerous, which is not conducive for use.

SUMMARY

The present disclosure aims to provide a jacking tool which has a simple structure and can select to finely adjust a rise distance of an item or a drop distance of the item according to an actual need of a user, so that it is convenient for the user to precisely finely adjust a jacking height of the item, which is conductive to making the user use the jacking tool to perform operations.

The objectives of the present disclosure are achieved below:

A jacking tool capable of achieving up-down fine adjustment includes a fixed portion and a lifting portion arranged on the fixed portion. The fixed portion includes a base and a guide rod arranged on the base; the lifting portion is provided with a lifting plate, a climbing mechanism, and an course adjustment grip for controlling the climbing mechanism; the course adjustment grip is pressed to drive the climbing mechanism, to control the lifting portion and the lifting plate to move up along the guide rod; the lifting portion is further provided with a locking mechanism clamped to the guide rod; the locking mechanism restricts the lifting portion from moving down; the lifting plate is slidably arranged on the lifting portion; an adjustment mechanism is arranged between the lifting portion and the lifting plate; and the adjustment mechanism can be driven to control the lifting plate to move up and down relative to the lifting portion, to achieve downward or upward fine adjustment on the lifting plate relative to the lifting portion.

Further, the adjustment mechanism includes a threaded rod and a drive assembly; the lifting plate is in threaded connection with the threaded rod; and when the drive assembly drives the threaded rod to rotate clockwise or anticlockwise, the lifting plate in threaded connection to the threaded rod moves up and down along the threaded rod.

Further, the lifting plate is provided with a connection portion; a threaded hole is provided in the connection portion; and the threaded rod is arranged in the threaded hole and is in threaded connection with the connection portion.

Further, the actuation component includes a linkage bevel gear, an actuating bevel gear, and an actuating arm arranged on the actuating bevel gear; the linkage bevel gear is arranged on the threaded rod; the actuating bevel gear is meshed with the linkage bevel gear; when the actuating arm is actuated to rotate, the actuating bevel gear is driven to rotate; the rotation of the actuating bevel gear can drive the linkage bevel gear and the threaded rod to rotate synchronously, to cause the lifting plate to move up and down along the threaded rod.

Further, the actuation component further includes a driven gear and a driving gear that is rotationally arranged on the lifting portion; two ends of the actuating arm are respectively connected to the driven gear and the actuating bevel gear; the driving gear is meshed with the driven gear; and the driving gear is connected to an actuator.

Further, a fixing hole is provided in the lifting portion; an actuating hole is provided in the driving gear; a rotating rod is arranged in the actuating hole and the fixing hole; connection holes are provided in an inner end of the actuator; gear holes are provided in the driving gear; and fixing rods are arranged in the gear holes and the connection holes.

Further, a position-limiting hole is provided in the lifting portion; a position-lifting sleeve is mounted inside the position-limiting hole; the actuating arm is arranged in the position-lifting sleeve; a dust cap is arranged on one side of the lifting portion; a transmission space is formed between the dust cap and the position-lifting sleeve; the driven gear and the driving gear are arranged in the transmission space; a hole for rotation corresponding to a position of the driving gear is provided in the dust cap; and the inner end of the actuator is arranged in the hole for rotation.

Further, the lifting portion is provided with a mounting hole; the lifting plate is provided with an adjustment sliding chute; and a guide rod is arranged in the mounting hole and the adjustment sliding chute.

Further, a mounting block is arranged at a bottom of the lifting portion; the mounting block is fixedly connected to the lifting portion; a mounting space is formed inside the lifting portion; a mounting portion is arranged in the middle of the mounting block; the mounting portion is located in the mounting space; a lower bearing is arranged in the mounting portion; a bearing groove is provided in a top in the mounting space; an upper bearing is arranged in the bearing groove; the threaded rod is arranged in the mounting space; an upper rotating portion and a lower rotating portion are respectively arranged at an upper end and a lower end of the threaded rod; the upper rotating portion is connected to the upper bearing; and the lower rotating portion is connected to the lower bearing.

Further, a climbing space is arranged on the lifting portion; the climbing mechanism is arranged in the climbing space; the lifting portion sleeves the guide rod; the guide rod penetrates through the climbing space; the climbing mechanism includes a climbing spring and a climbing block which sleeve the guide rod; two ends of the climbing spring respectively press against a lower surface of the climbing block and a bottom of the mounting space; the lifting portion is provided with a fixed grip; the course adjustment grip is hinged to the fixed grip; an inner end of the course adjustment grip is exposed in the climbing space; the inner end of the course adjustment grip is abutted against an upper surface of the climbing block; a clamping platform is arranged at a top end of the lifting portion; the locking mechanism includes a locking piece and a locking spring which sleeve the guide rod; one end of the locking piece is clamped with the clamping platform; and two ends of the locking spring are respectively abutted against the top end of the lifting portion and a lower surface of the locking piece.

Compared with the prior art, the present disclosure has outstanding and beneficial technical effects:

A jacking tool capable of achieving up-down fine adjustment includes a fixed portion and a lifting portion arranged on the fixed portion. The fixed portion includes a base and a guide rod arranged on the base; the lifting portion is provided with a lifting plate, a climbing mechanism, and an course adjustment grip for controlling the climbing mechanism; the course adjustment grip is pressed to drive the climbing mechanism, to control the lifting portion and the lifting plate to move up along the guide rod; the lifting portion is further provided with a locking mechanism clamped to the guide rod; the locking mechanism restricts the lifting portion from moving down; the lifting plate is slidably arranged on the lifting portion; an adjustment mechanism is arranged between the lifting portion and the lifting plate; and the adjustment mechanism can be driven to control the lifting plate to move up and down relative to the lifting portion, to achieve downward or upward fine adjustment on the lifting plate relative to the lifting portion. During use, a user needs to first place the lifting plate on the lifting portion below an item that needs to be jacked. In this case, the user then presses the course adjustment grip to drive the climbing mechanism, thus controlling the lifting portion to move up along the guide rod, so that the lifting plate on the lifting portion moves up together with the lifting portion. After that, the item on the lifting plate can be jacked for mounting. Furthermore, the locking mechanism on the lifting portion is clamped to the guide rod, so that when the upward movement of the lifting portion is completed, the locking mechanism may be clamped to the guide rod, thereby restricting the automatic down movement of the lifting portion and stably mounting the item that is placed on the lifting plate. Since the adjustment mechanism on the lifting portion can control the lifting plate to move down or up on the lifting portion, when a jacking height of the item is slightly greater than an desired height, the user can control the lifting plate to move down relative to the lifting portion by controlling the adjustment mechanism, so that the item on the lifting plate can move down together with the lifting portion, thereby achieving fine adjustment on a drop height of the item. When the jacking height of the item is slightly less than the desired height, the user can control the lifting plate to move up relative to the lifting portion through the adjustment mechanism, so that the item on the lifting plate can move up together with the lifting portion, thereby achieving fine adjustment on a rise height of the item, and the user can accurately control the jacking height of the item. Compared with the jacking tool on the existing market which can only achieve downward fine adjustment on the jacking height of the item, this jacking tool has a single function. When the user needs to upwards finely adjust the jacking height of the item, the need of the user cannot be quickly met, and the jacking height of the item can reach the desired height only if a series of steps are executed. The operation is complex, and it is not conductive for use. The jacking tool of the present disclosure can control the lifting plate to move up or down relative to the lifting portion by directly controlling the adjustment mechanism according to different needs of the user, so that the jacking height of the item on the lifting plate can be finely adjusted upwards or downwards. In addition, there are no extra steps required, so that the operation is simple, fast, and convenient, which is conducive to using the jacking tool for operation by the user, and the user can more precisely and finely adjust the jacking height of the item.

Figure 1:
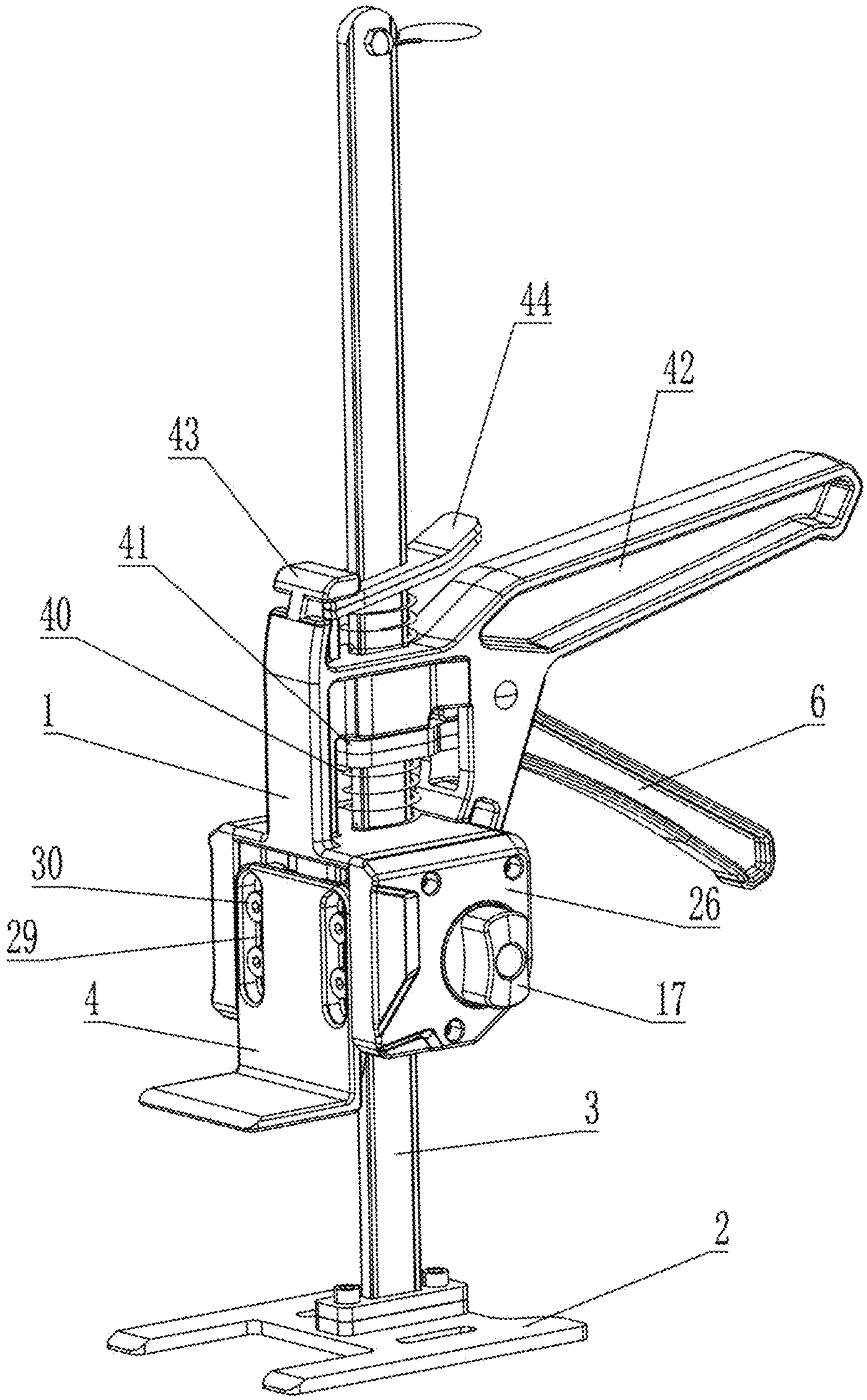
FIG. 1 is a three-dimensional diagram of the present disclosure.
Figure 2:
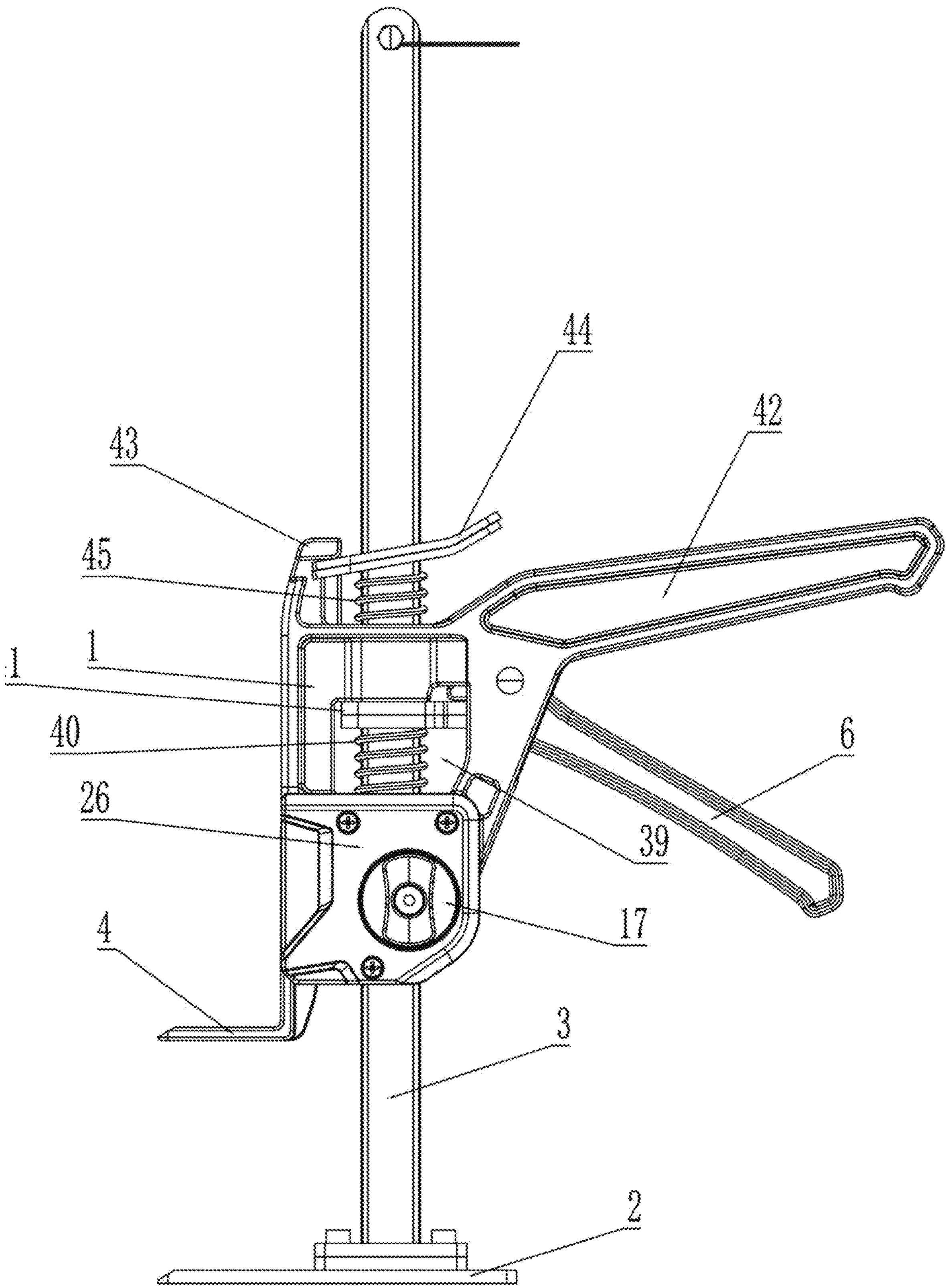
FIG. 2 is a schematic structural diagram of the present disclosure.
Figure 3:
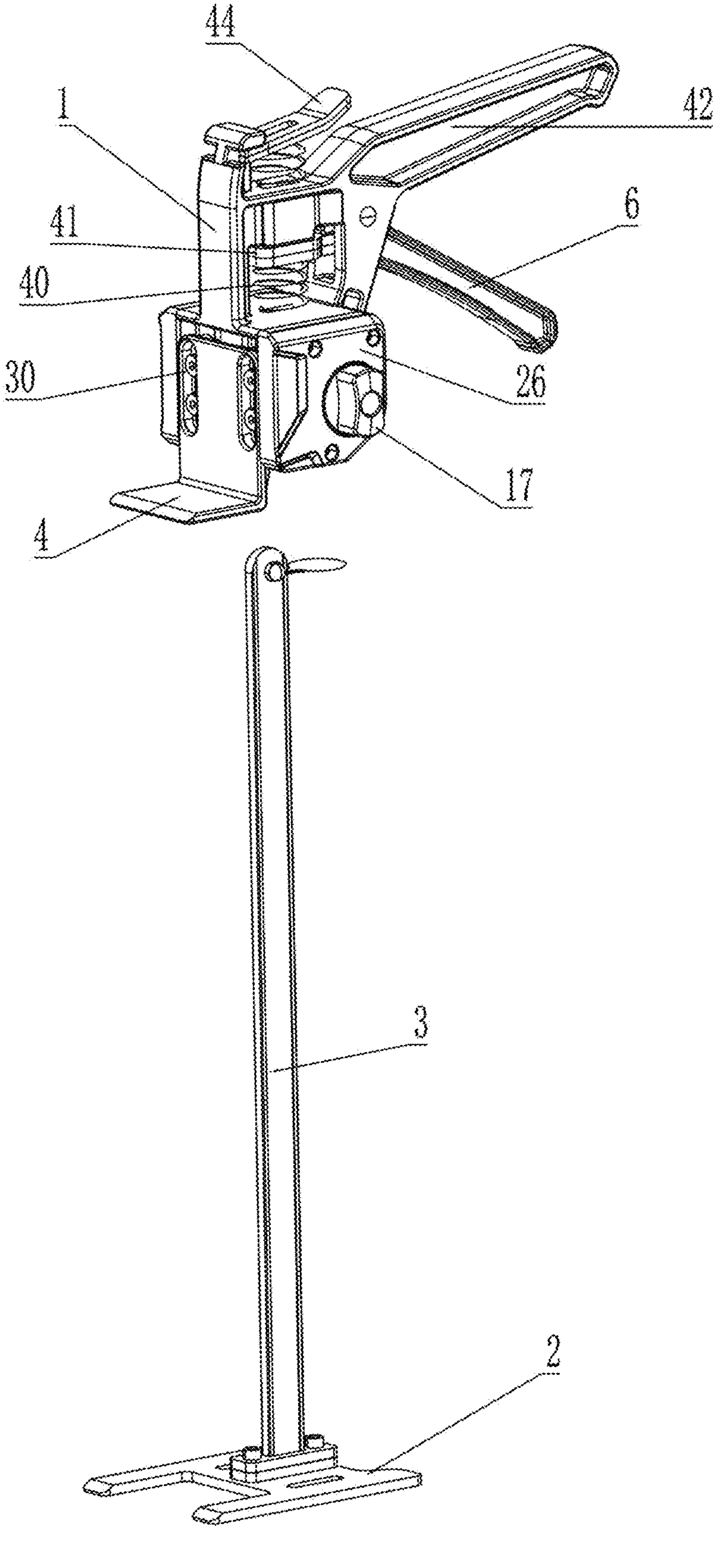
FIG. 3 is a schematic structural diagram of the present disclosure.
Figure 4:
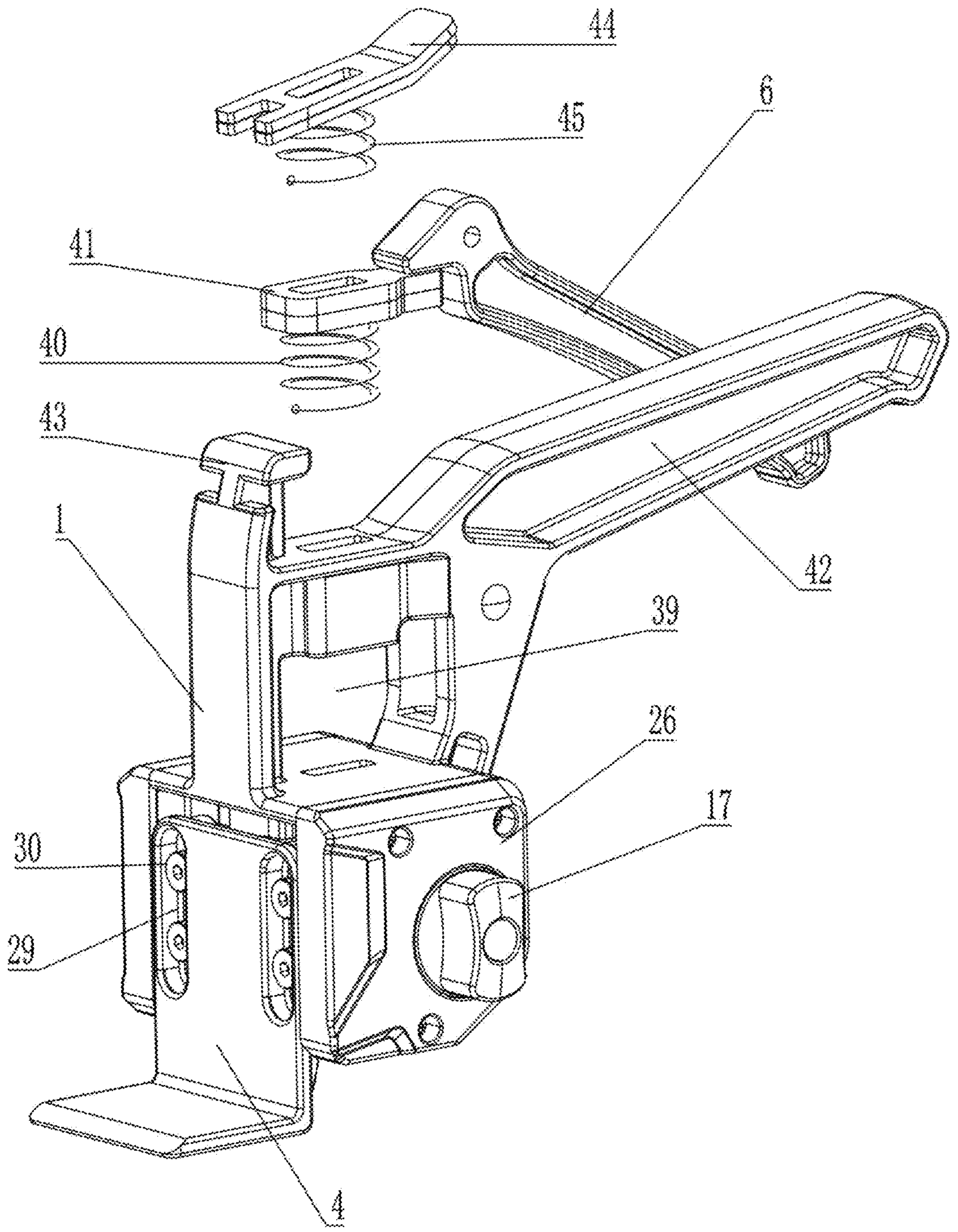
FIG. 4 is an exploded view of a lifting portion and a guide rod according to the present disclosure.
Figure 5:
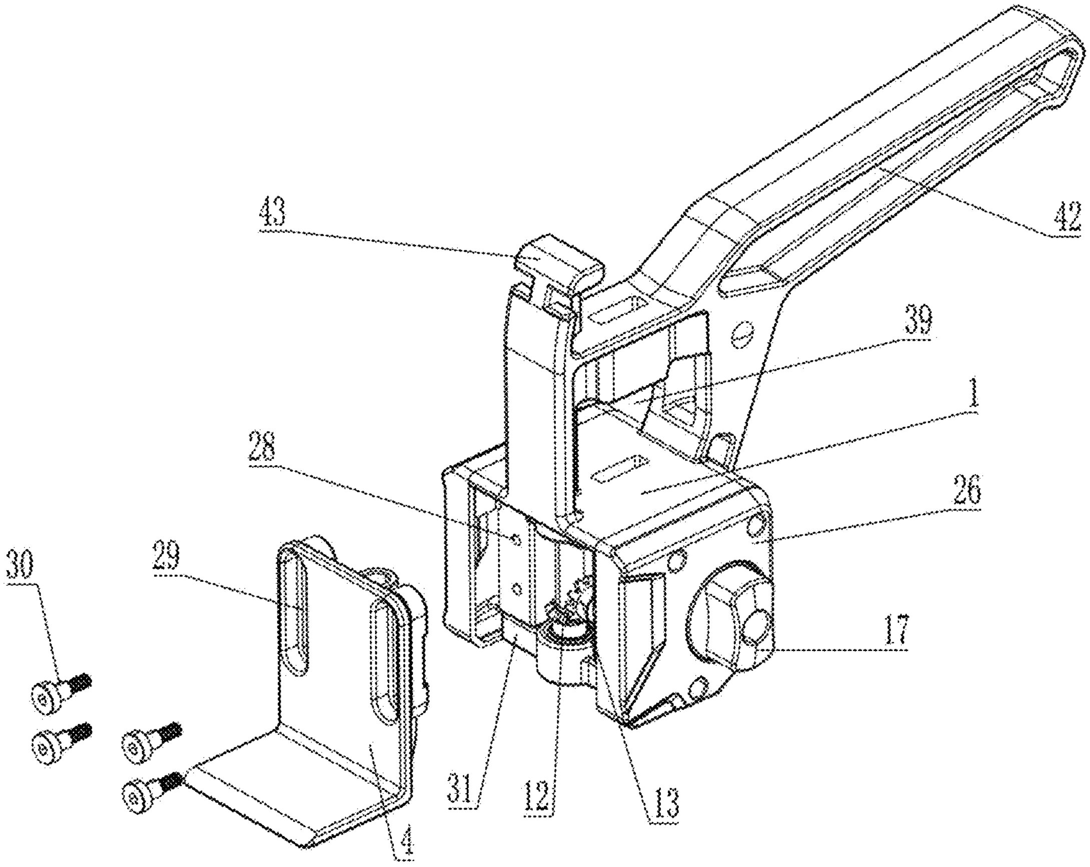
FIG. 5 is an exploded view of a lifting plate and a lifting portion according to the present disclosure.
Figure 6:
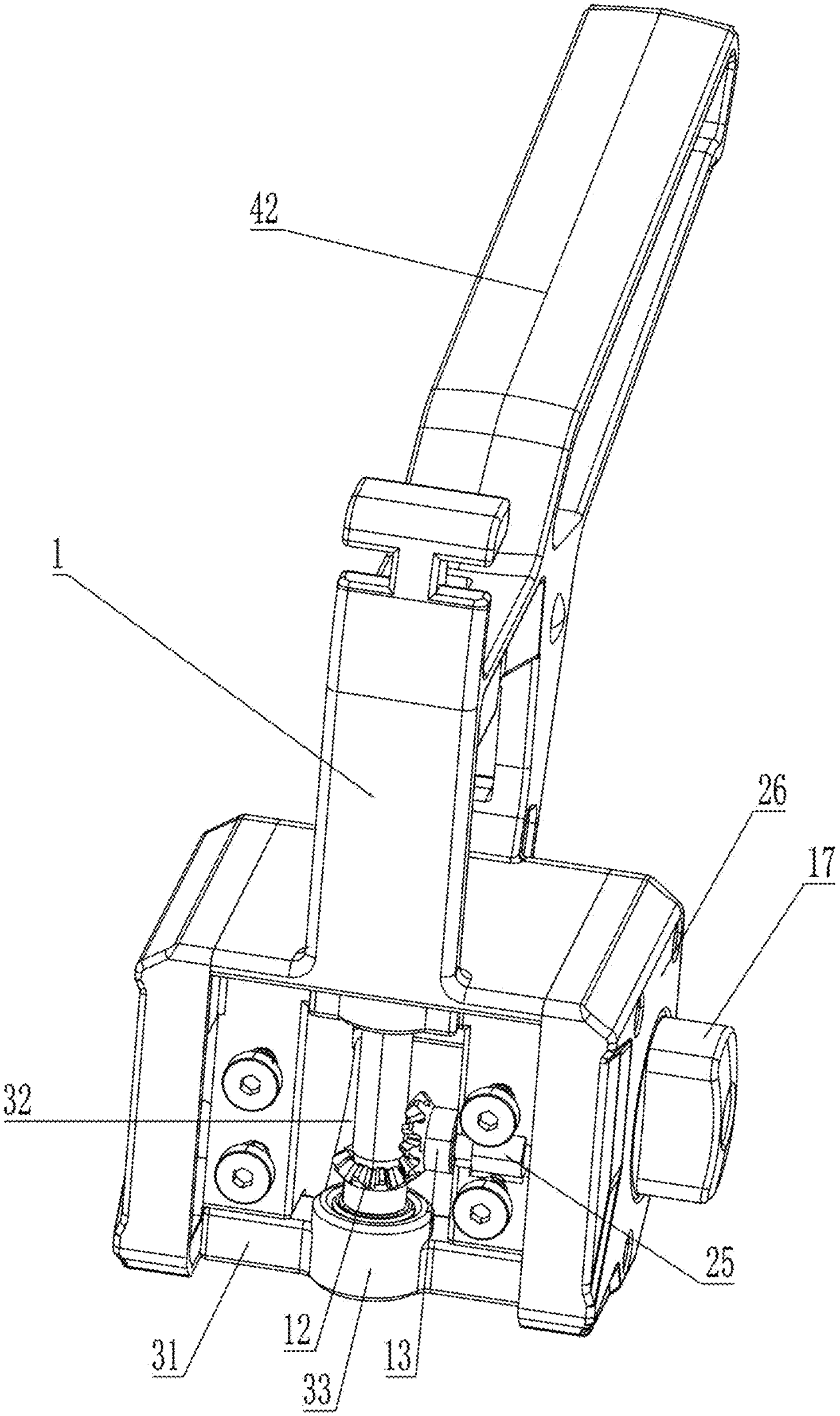
FIG. 6 is a schematic structural diagram of a lifting portion according to the present disclosure.
Figure 7:
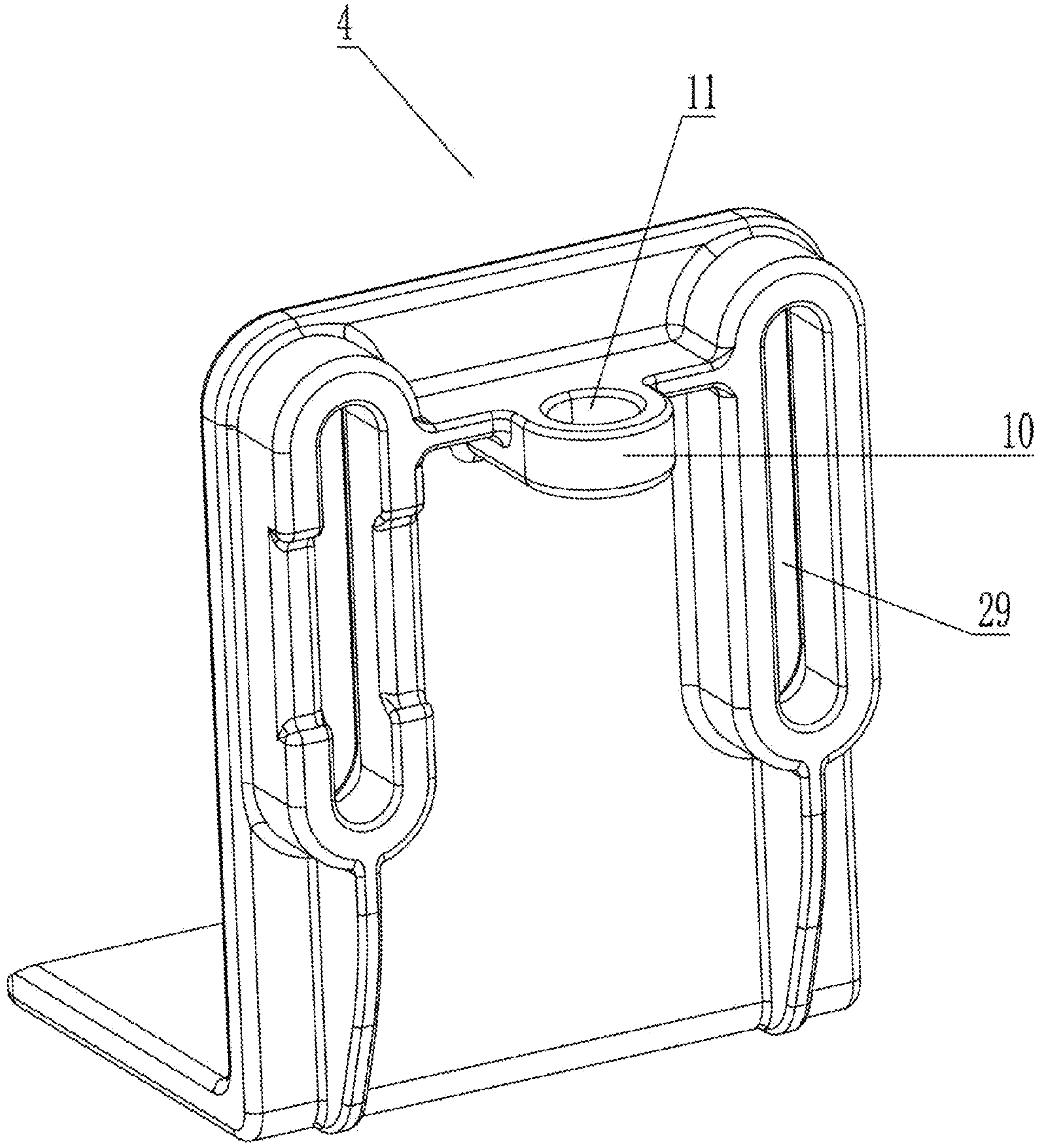
FIG. 7 is a three-dimensional diagram of a lifting plate according to the present disclosure.
Figure 8:
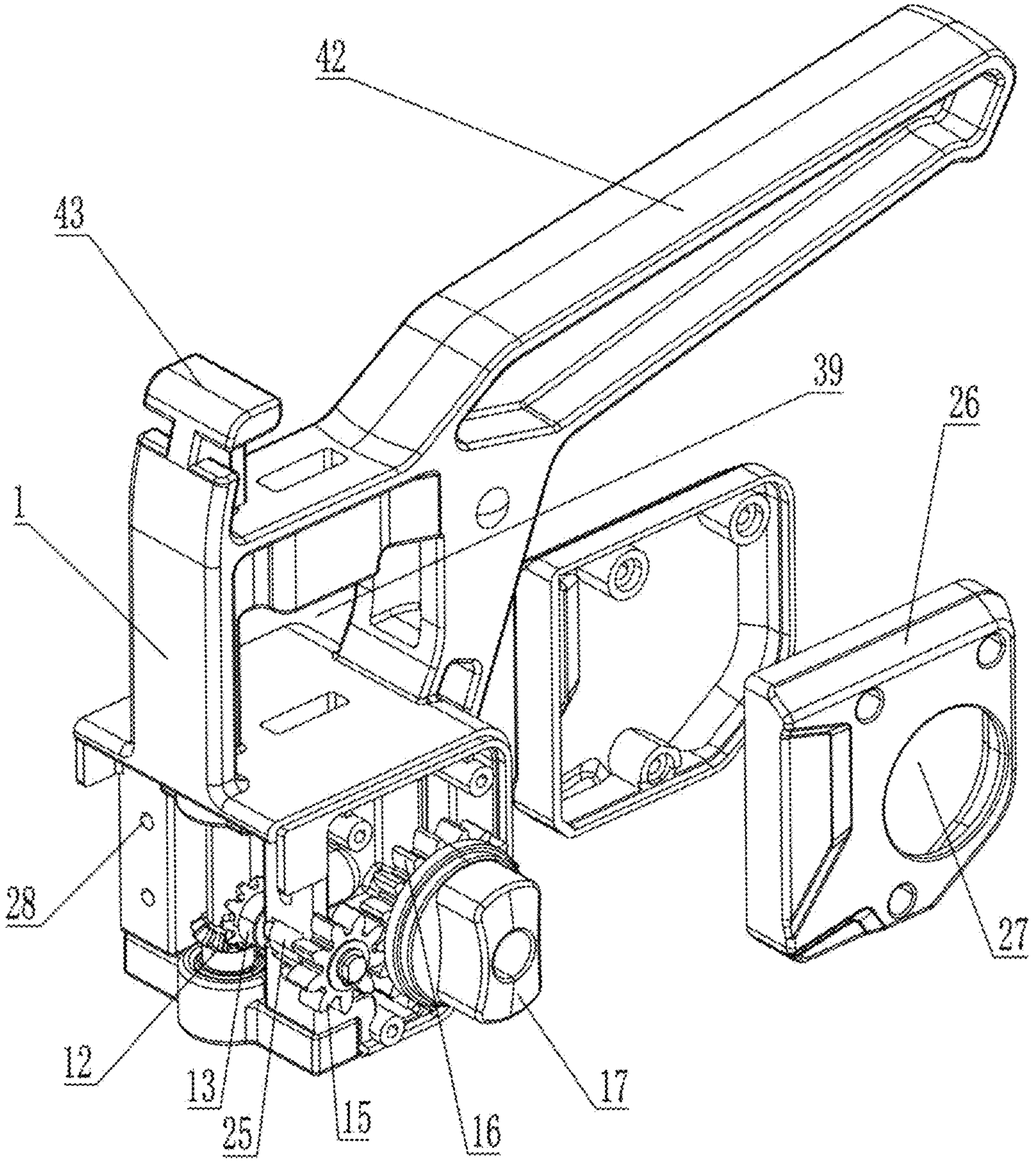
FIG. 8 is an exploded view of a lifting portion and a dust cap according to the present disclosure.
Figure 9:
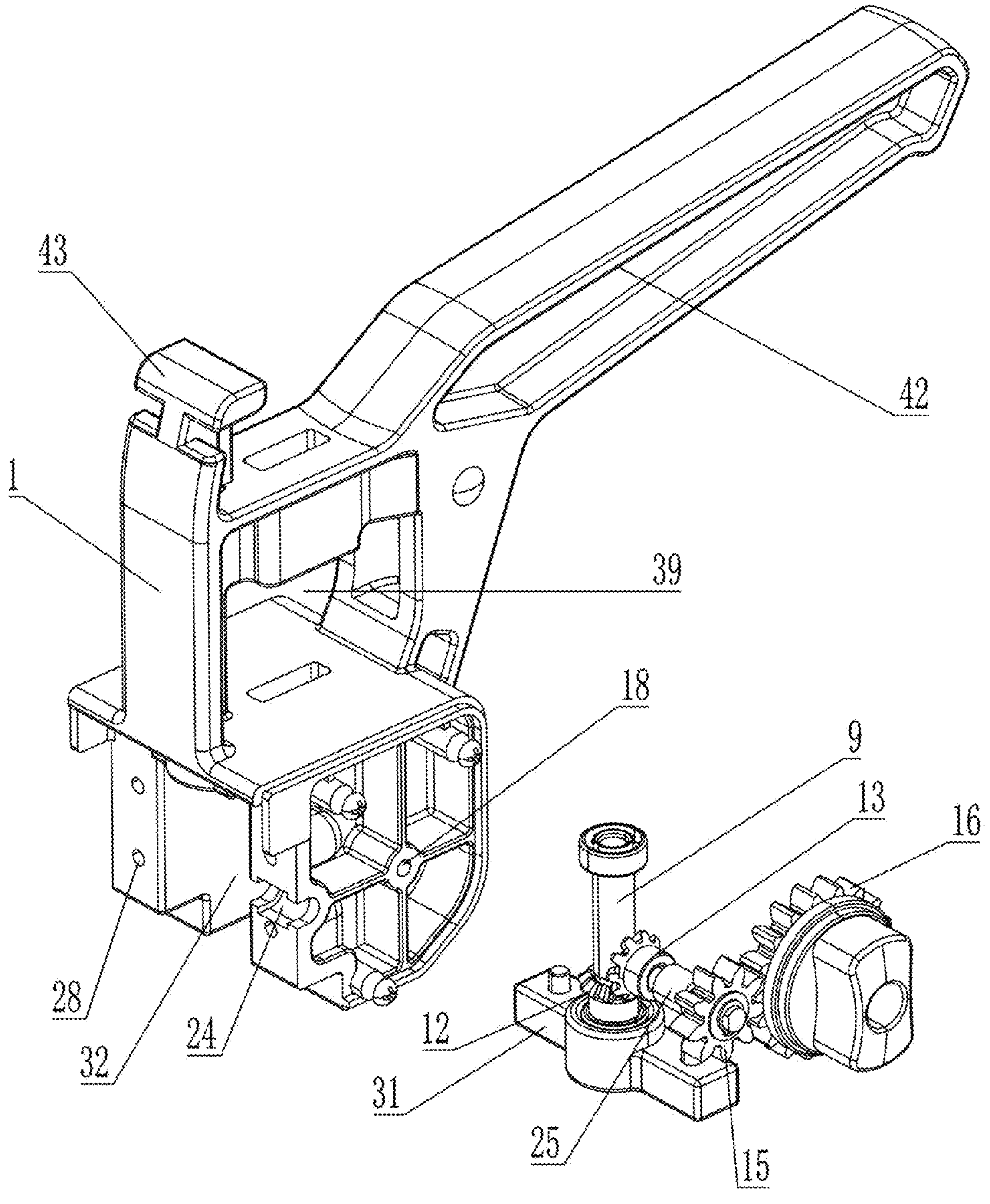
FIG. 9 is an exploded view of a lifting portion and an adjustment mechanism according to the present disclosure.
Figure 10:
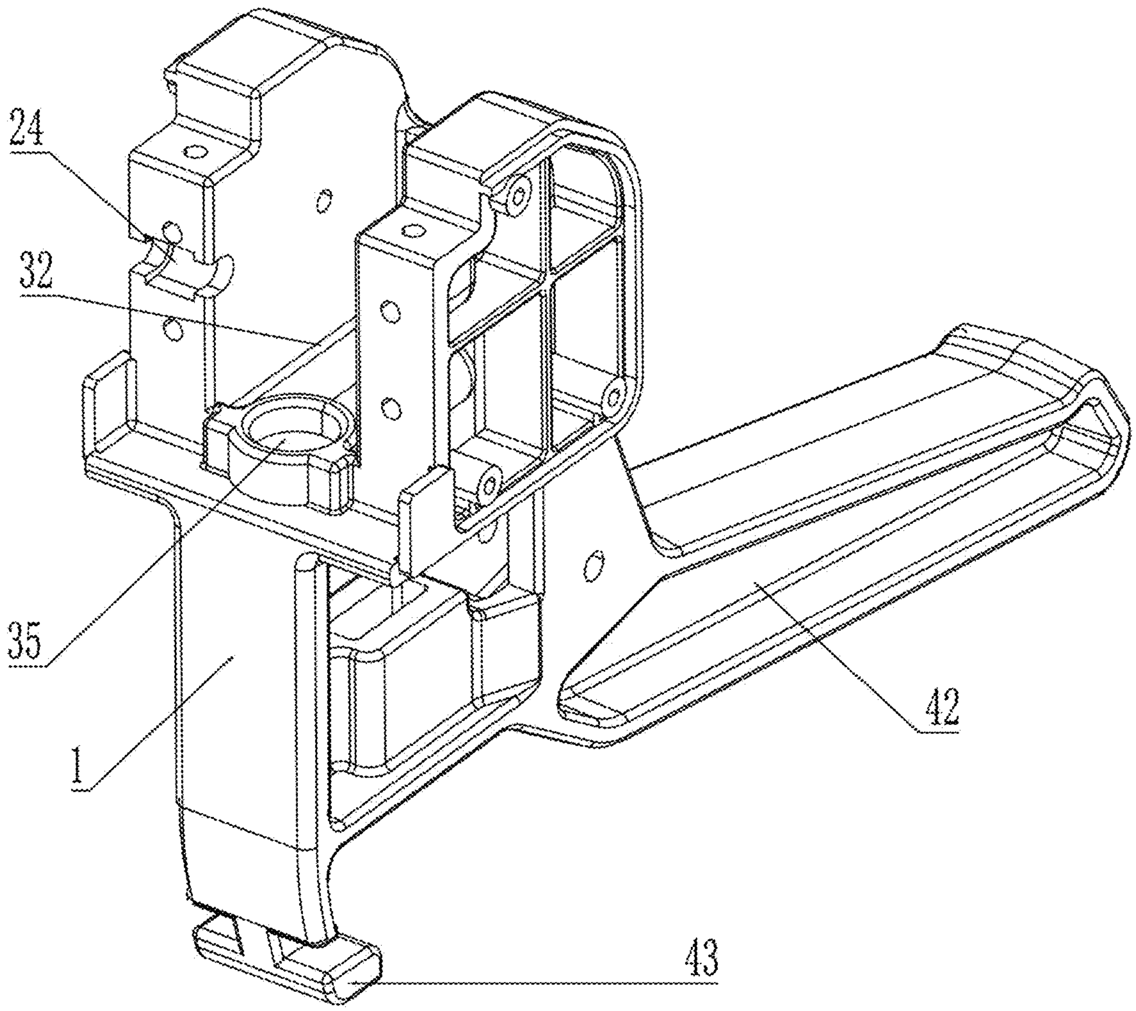
FIG. 10 is a three-dimensional diagram of a lifting portion and a fixed grip according to the present disclosure.
Figure 11:
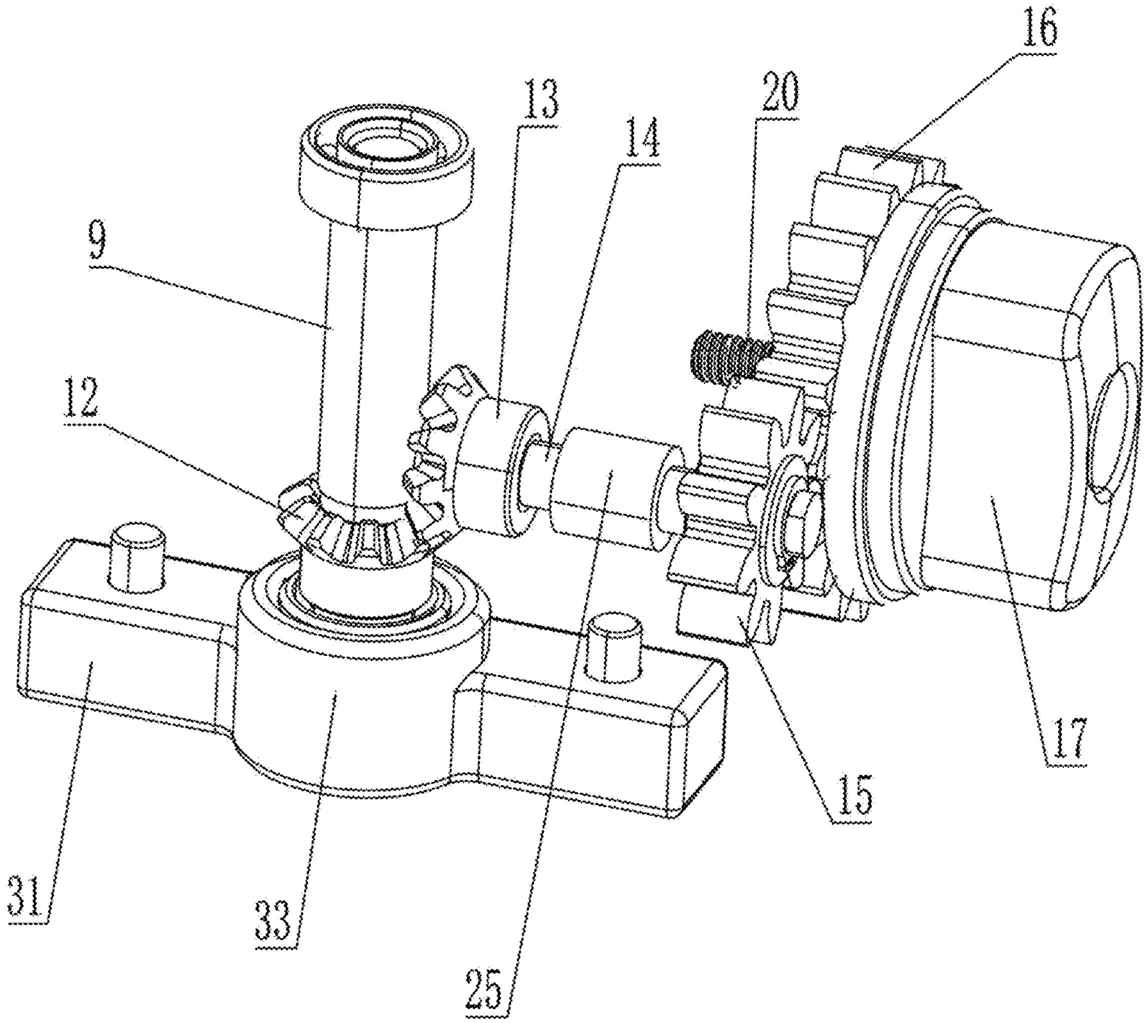
FIG. 11 is a schematic structural diagram I of a threaded rod and an actuation component according to the present disclosure.
Figure 12:
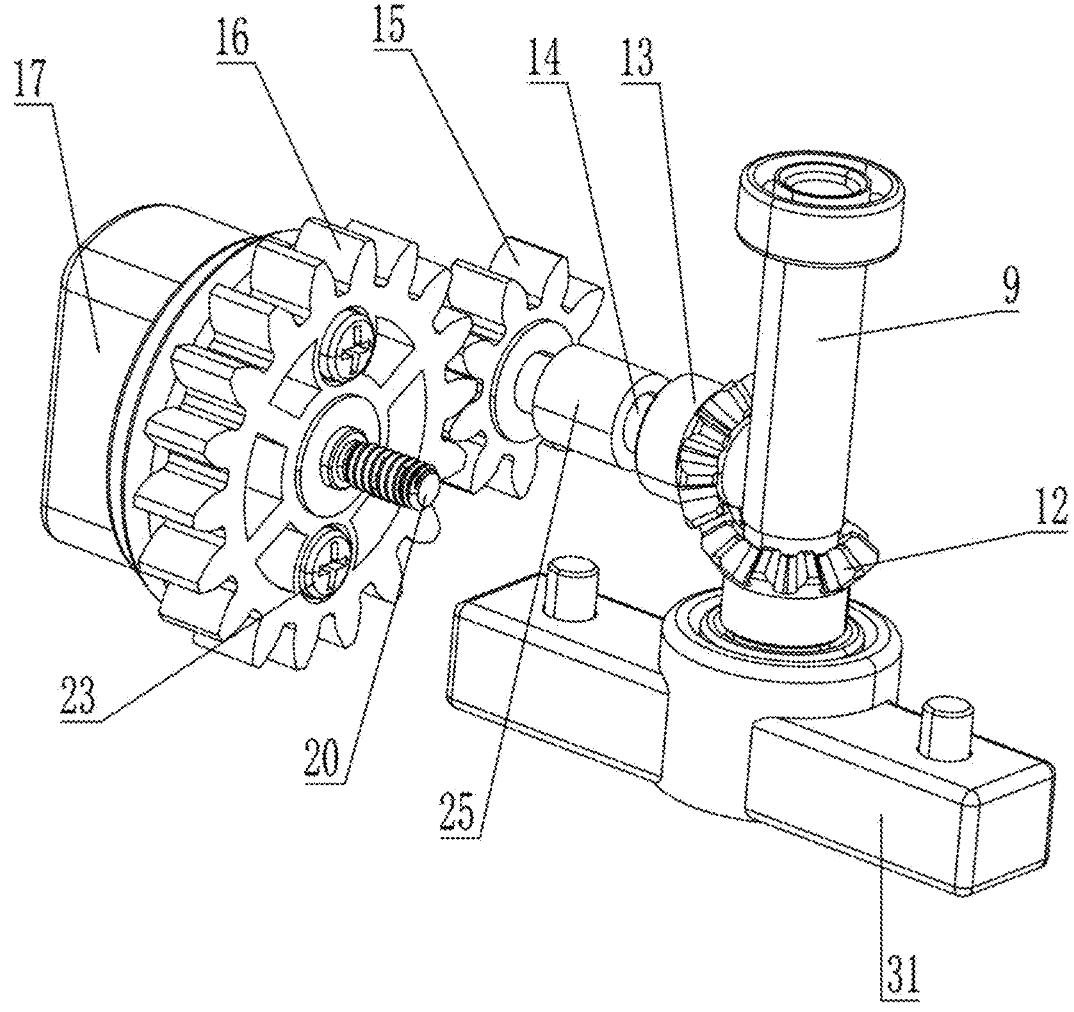
FIG. 12 is a schematic structural diagram II of a threaded rod and an actuation component according to the present disclosure.
Figure 13:
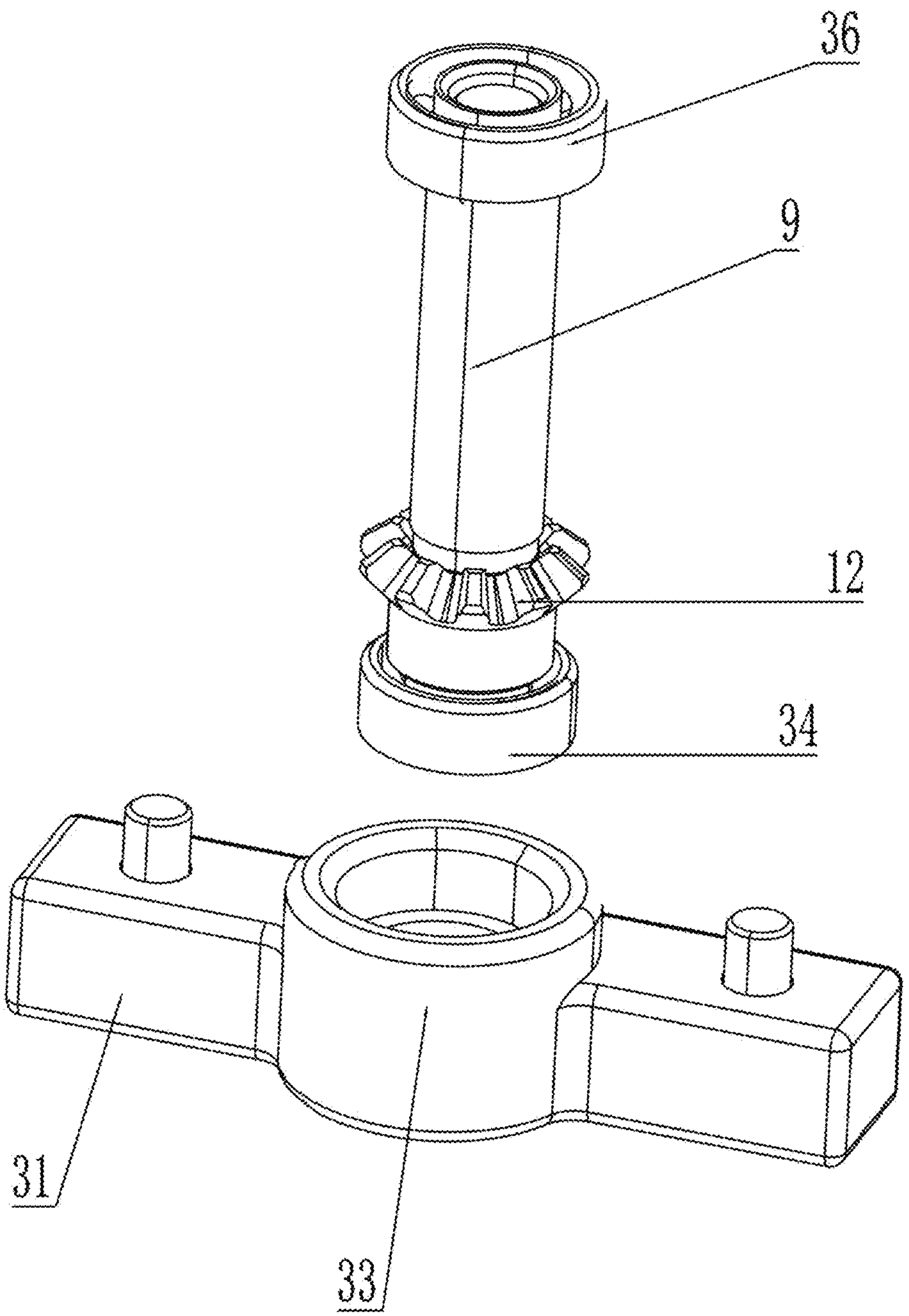
FIG. 13 is an exploded view of a threaded rod and a mounting block according to the present disclosure.
Figure 14:
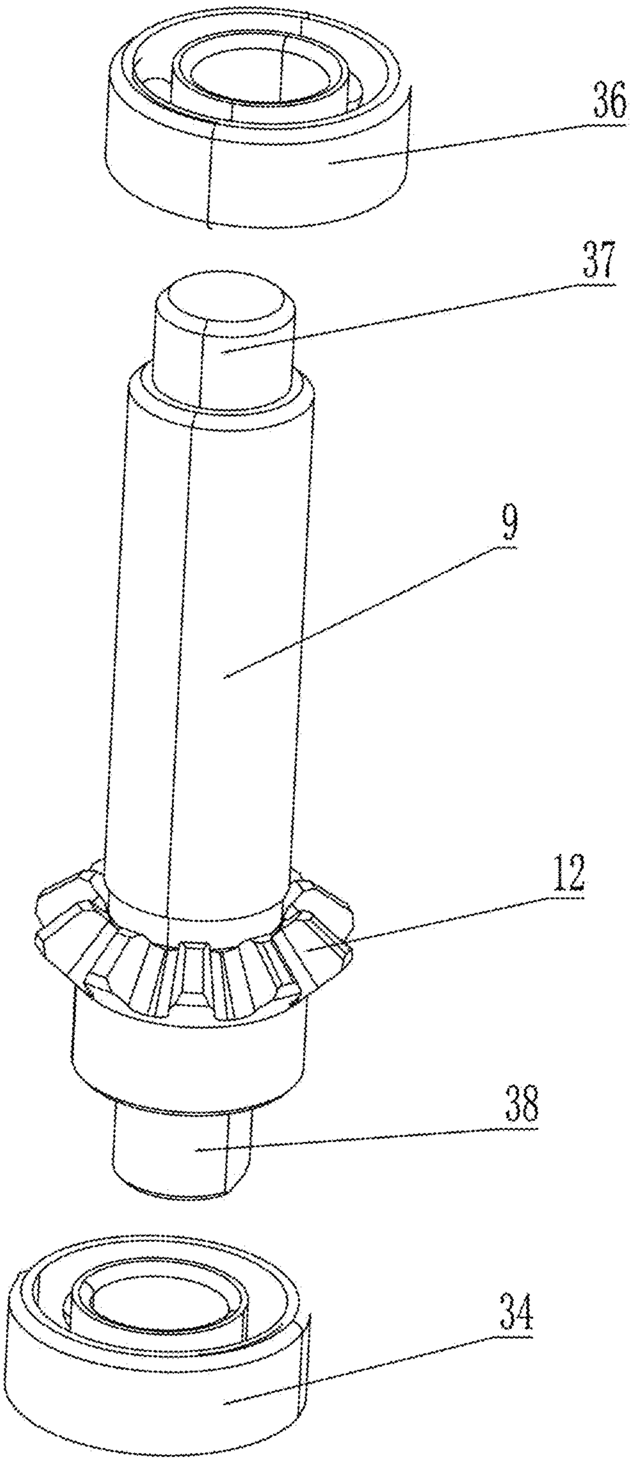
FIG. 14 is an exploded view of a threaded rod, an upper bearing, and a lower bearing according to the present disclosure.
Figure 15:
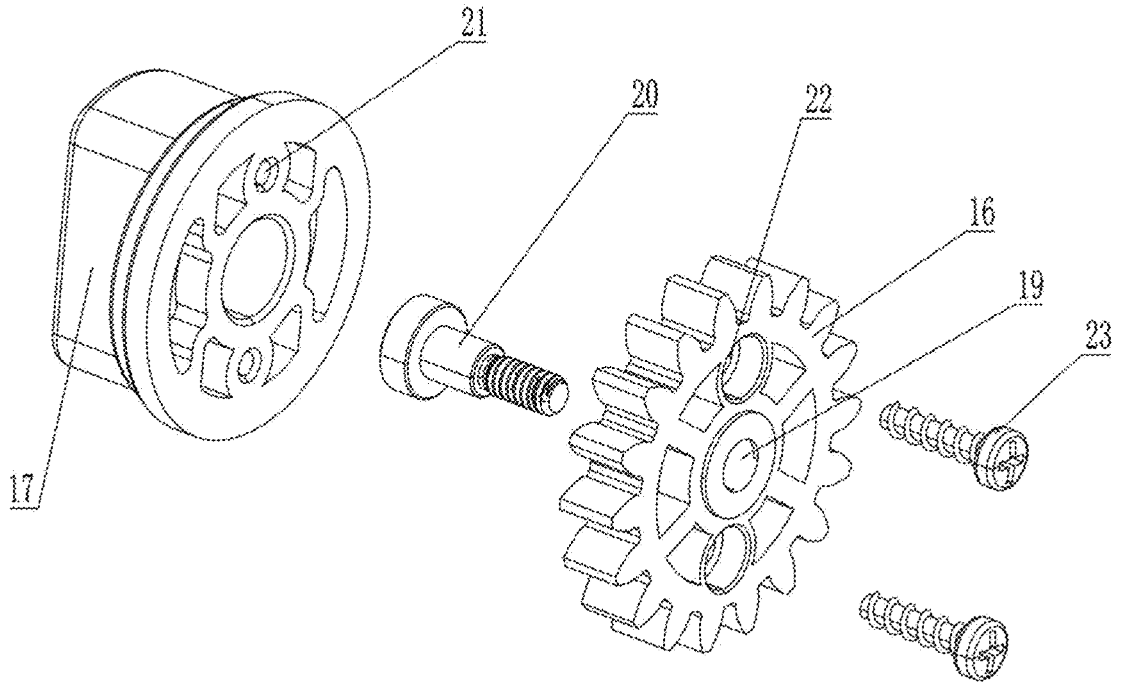
FIG. 15 is an exploded view of an actuator and a driving gear according to the present disclosure.

Meanings of reference numerals in the drawings:

1: lifting portion; 2: base; 3: guide rod; 4: lifting plate; 5: climbing mechanism; 6: course adjustment grip;
7: locking mechanism; 8: adjustment mechanism; 9: threaded rod; 10: connection portion; 11: threaded hole;
12: linkage bevel gear; 13: actuating bevel gear; 14: actuating arm; 15: driven gear;
16: driving gear; 17: actuator; 18: fixing hole; 19: actuating hole; 20: rotating rod;
21: connection hole; 22: gear hole; 23: fixed rod; 24: position-limiting hole; 25: position-limiting sleeve;
26: dust cap; 27: hole for rotation; 28: mounting hole; 29: adjustment sliding chute; 30: mounting rod;

31: mounting block; 32: mounting space; 33: mounting portion; 34: lower bearing; 35: bearing groove;
36: upper bearing; 37: upper rotating portion; 38: lower rotating portion; 39: climbing space; 40: climbing spring;
41: climbing block; 42: fixed grip; 43: clamping platform; 44: locking piece; and 45: locking spring.

DETAILED DESCRIPTION OF THE EMBODIMENTS

The present invention will be further described below in conjunction with the specific embodiments.

A jacking tool capable of achieving up-down fine adjustment includes a fixed portion and a lifting portion 1 arranged on the fixed portion. The fixed portion includes a base 2 and a guide rod 3 arranged on the base 2. The lifting portion 1 is provided with a lifting plate 4, a climbing mechanism 5, and an course adjustment grip 6 for controlling the climbing mechanism 5. The course adjustment grip 6 is pressed to actuate the climbing mechanism 5, to control the lifting portion 1 and the lifting plate 4 to move up along the guide rod 3. The lifting portion 1 is further provided with a locking mechanism 7 clamped to the guide rod 3. The locking mechanism 7 restricts the lifting portion 1 from moving down. The lifting plate 4 is slidably arranged on the lifting portion 1. An adjustment mechanism 8 is arranged between the lifting portion 1 and the lifting plate 4. The adjustment mechanism 8 can be actuated to control the lifting plate 4 to move up and down relative to the lifting portion 1, to achieve downward or upward fine adjustment on the lifting plate 4 relative to the lifting portion 1. During use, a user needs to first place the lifting plate 4 on the lifting portion 1 below an item that needs to be jacked. In this case, the user then presses the course adjustment grip 6 to drive the climbing mechanism 5, thus controlling the lifting portion 1 to move up along the guide rod 3, so that the lifting plate 4 on the lifting portion 1 moves up together with the lifting portion 1. After that, the item on the lifting plate 4 can be jacked for mounting. Furthermore, the locking mechanism 7 on the lifting portion 1 is clamped to the guide rod 3, so that when the upward movement of the lifting portion 1 is completed, the locking mechanism 7 may be clamped to the guide rod 3, thereby restricting the automatic down movement of the lifting portion 1 and stably mounting the item that is placed on the lifting plate 4. Since the adjustment mechanism 8 on the lifting portion 1 can control the lifting plate 4 to move down or up on the lifting portion 1, when a jacking height of the item is slightly greater than an desired height, the user can control the lifting plate 4 to move down relative to the lifting portion 1 by controlling the adjustment mechanism 8, so that the item on the lifting plate 4 can move down together with the lifting portion 1, thereby achieving fine adjustment on a drop height of the item. When the jacking height of the item is slightly less than the desired height, the user can control the lifting plate 4 to move up relative to the lifting portion 1 through the adjustment mechanism 8, so that the item on the lifting plate 4 can move up together with the lifting portion 1, thereby achieving fine adjustment on a rise height of the item, and the user can accurately control the jacking height of the item. Compared with the jacking tool on the existing market which can only achieve downward fine adjustment on the jacking height of the item, this jacking tool has a single function. When the user needs to upwards finely adjust the jacking height of the item, the need of the user cannot be quickly met, and the jacking height of the item can reach the desired height only if a series of steps are executed. The operation is complex, and it is not conductive for use. The jacking tool of the present disclosure can control the lifting plate 4 to move up or down relative to the lifting portion 1 by directly controlling the adjustment mechanism 8 according to different needs of the user, so that the jacking height of the item on the lifting plate 4 can be finely adjusted upwards or downwards. In addition, there are no extra steps required, so that the operation is simple, fast, and convenient, which is conducive to using the jacking tool for operation by the user, and the user can more precisely and finely adjust the jacking height of the item.

Preferably, the adjustment mechanism 8 includes a threaded rod 9 and an actuation component; the lifting plate 4 is in threaded connection with the threaded rod 9; and when the actuation component drives the threaded rod 9 to rotate clockwise or anticlockwise, the lifting plate 4 in threaded connection to the threaded rod 9 may move up and down along the threaded rod 9. Since the lifting plate 4 is in threaded connection with the threaded rod 9, when the user intends to control the lifting plate 4 to move up or down relative to the lifting portion 1, the user can control the threaded rod 9 to rotate clockwise or anticlockwise through the actuation component, to cause the lifting plate 4 on the threaded rod 9 to move up or down along the threaded rod 9. Thus, the user can smoothly control the upward or downward fine adjustment on the jacking height of the item on the lifting plate 4.

Preferably, the lifting plate 4 is provided with a connection portion 10; a threaded hole 11 is provided in the connection portion 10; and the threaded rod 9 is arranged in the threaded hole 11 and is in threaded connection with the connection portion 10. The threaded rod 9 is in threaded connection with the lifting plate 4 through the threaded hole 11 in the connection portion 10 of the lifting plate 4, so that the threaded connection between the lifting plate 4 and the threaded rod 9 is more stable and firmer.

Preferably, the actuation component includes a linkage bevel gear 12, an actuating bevel gear 13, and an actuating arm 14 arranged on the actuating bevel gear 13; the linkage bevel gear 12 is arranged on the threaded rod 9; the actuating bevel gear 13 is meshed with the linkage bevel gear 12; when the actuating arm 14 is actuated to rotate, the actuating bevel gear 13 can be driven to rotate; the rotation of the actuating bevel gear 13 drives the linkage bevel gear 12 and the threaded rod 9 to rotate synchronously, to cause the lifting plate 4 to move up and down along the threaded rod 9. Since the actuating bevel gear 13 is meshed with the linkage bevel gear 12, and the actuating bevel gear 13 is connected to the actuating arm 14. When the user intends to finely adjust a rise distance of the item, the user can clockwise rotate the actuating arm 14, causing the actuating arm 14 to drive the actuating bevel gear 13 to clockwise rotate. The actuating bevel bear 13 drives the linkage bevel gear 12 to clockwise rotate. Since the linkage bevel gear 12 is arranged on the threaded rod 9 and fixedly connected to the threaded rod 9, the threaded rod 9 can also clockwise rotate together with the linkage bevel gear after the linkage bevel gear clockwise rotates. Thus, the lifting plate 4 on the threaded rod 9 moves up through the connection portion 10 to complete the fine adjustment on the rise distance of the item. When the user intends to finely adjust a drop distance of the item, the user can anticlockwise rotate the actuating arm 14, causing the actuating arm 14 to drive the actuating bevel gear 13 to anticlockwise rotate. The actuating bevel gear 13 drives the linkage bevel gear 12 to anticlockwise rotate, and the threaded rod 9 can anticlockwise rotate together with the linkage bevel gear after the linkage bevel gear anticlockwise rotates. Thus, the lifting plate 4 on the threaded rod 9 moves up through the connection portion 10, to complete the fine adjustment on the drop distance of the item. The user can control the threaded rod 9 to rotate clockwise or anticlockwise by controlling the actuating arm 14, so that the operation is simple, fast, and convenient.

Preferably, the actuation component further includes a driven gear 15 and a driving gear 16 that is rotationally arranged on the lifting portion 1; two ends of the actuating arm 14 are respectively connected to the driven gear 15 and the actuating bevel gear 13; the driving gear 16 is meshed with the driven gear 15; and the driving gear 16 is connected to an actuator 17. The actuator 17 is a polygonal knob that is common on the market. During rotation, the user can hold the actuator with fingers and turn it. Since the driving gear 16 is rotationally arranged the lifting portion 1, and the actuator 17 is connected to the driving gear 16, when the actuator 17 is turned, the actuator can smoothly drive the driving gear 16 to rotate on the lifting portion 1. The rotation of the driving gear 16 can drive the driven gear 15 that is meshed with the driving gear 16 to rotate together. Since the two ends of the actuating arm 14 are respectively connected to the driven gear 15 and the actuating bevel gear 13, after rotating, the driven gear 15 can drive the actuating arm 14 and the actuating bevel gear 13 at one end of the actuating arm 14 to rotate together. Thus, the actuating bevel gear 13 can drive the linkage bevel gear to rotate, ultimately causing the lifting plate 4 on the threaded rod 9 to move up and down along the threaded rod 9. In addition, the user can control the lifting plate 4 to move up or down by selecting clockwise rotation or anticlockwise rotation of the actuator 17. In addition, by the arrangement of the actuator 17, the user can precisely adjust the rise or drop height of the lifting plate 4 through the actuator 17. The driving gear 16 is a large gear and the actuating bevel gear 13 is a small gear. When the driving gear 16 rotates a circle, the actuating gear can be driven to rotate several circles, so that the user can control the lifting plate 4 to move up and down only by rotating the actuator 17 in a small angle. Thus, the movement of the lifting plate 4 is faster and more convenient, and it is convenient for the user to carry out fine adjustment.

Preferably, a fixing hole 18 is provided in the lifting portion 1; an actuating hole 19 is provided in the driving gear 16; a rotating rod 20 is arranged in the actuating hole 19 and the fixing hole 18; connection holes 21 are provided in an inner end of the actuator 17; gear holes 22 are provided in the driving gear 16; and fixing rods 23 are arranged in the gear holes 22 and the connection holes 21. The driving gear 16 is rotationally arranged on the lifting portion 1 by arranging the rotating rod 20 in the fixing hole 18 of the lifting portion 1 and the actuating hole 19 of the driving gear 16. By the arrangement of the rotating rod 20, the driving gear 16 can rotate smoothly, without falling from the lifting portion 1. The actuator 17 is fixedly connected to the driving gear 16 through the connection hole 21 at the inner end and the fixing rod 23 in the gear hole 22 of the driving gear 16, so that when the user rotates the actuator 17, the driving gear 16 can be smoothly driven to rotate. In addition, there are two gear holes 22, two connection holes 21, and two fixing rods 23, so that the actuator 17 can be connected to the driving gear 16 more stably and firmly.

Preferably, a position-limiting hole 24 is provided in the lifting portion 1; a position-lifting sleeve 25 is mounted inside the position-limiting hole 24; the actuating arm 14 is arranged in the position-lifting sleeve 25; a dust cap 26 is arranged on one side of the lifting portion 1; a transmission space is formed between the dust cap 26 and the position-lifting sleeve 25; the driven gear 15 and the driving gear 16 are arranged in the transmission space; a hole 27 for rotation corresponding to a position of the driving gear 16 is provided in the dust cap 26; and the inner end of the actuator 17 is arranged in the hole 27 for rotation. The position-limiting sleeve 25 is fixedly mounted inside the position-limiting hole 24 of the lifting portion 1, and the actuating arm 14 is arranged in the position-limiting sleeve 25, without being in contact with the inner wall of the position-limiting hole 24, which can effectively reduce the frictional force generated during the rotation of the actuating arm 14, reduce wear, and prolong the service life of the actuating arm 14. In addition, the arrangement of the position-limiting sleeve 25 can avoid the actuating arm 14 from randomly moving in the position-limiting hole 24, so that the user can normally control the lifting plate 4 to be finely adjusted upwards and downwards relative to the lifting portion 1 by rotating the actuating arm 14.

Preferably, the lifting portion 1 is provided with a mounting hole 28; the lifting plate 4 is provided with an adjustment sliding chute 29; and a mounting rod 30 is arranged in the mounting hole 28 and the adjustment sliding chute 29. The mounting rod 30 is arranged in the mounting hole 28 of the lifting portion 1 and the adjustment sliding chute 29 of the lifting plate 4. The lifting plate 4 and the lifting portion 1 have no fixed connection relationship. When the threaded rod 9 rotates, the lifting plate 4 can only move up and down along the adjustment sliding chute 29. Furthermore, when the user intends to upwards increase a fine-adjustment distance of the lifting plate 4, a manufacturer can increase lengths of the threaded rod 9 and the adjustment sliding chute 29, thereby increasing an upward movement distance for the lifting plate 4.

Preferably, a mounting block 31 is arranged at a bottom of the lifting portion 1; the mounting block 31 is fixedly connected to the lifting portion 1; a mounting space 32 is formed inside the lifting portion 1; a mounting portion 33 is arranged in the middle of the mounting block 31; the mounting portion 33 is located in the mounting space 32; a lower bearing 34 is arranged in the mounting portion 33; a bearing groove 35 is provided in a top in the mounting space 32; an upper bearing 36 is arranged in the bearing groove 35; the threaded rod 9 is arranged in the mounting space 32; an upper rotating portion 37 and a lower rotating portion 38 are respectively arranged at an upper end and a lower end of the threaded rod 9; the upper rotating portion 37 is connected to the upper bearing 36; and the lower rotating portion 38 is connected to the lower bearing 34. The mounting block 31 is fixedly connected to the bottom of the lifting portion 1; the mounting portion 33 in the middle of the mounting block 31 is located in the mounting space 32, and the threaded rod 9 is in the mounting space 32. The upper rotating portion 37 at the top end of the threaded rod 9 is connected to the upper bearing 36, and the lower rotating portion 38 at the bottom end of the threaded rod 9 is connected to the lower bearing 34, so that the threaded rod 9 can be smoothly rotationally mounted in the mounting space 32, and the actuating bevel gear 13 can drive the threaded rod 9 to rotate together through the linkage bevel gear 12.

Preferably, a climbing space 39 is arranged on the lifting portion 1; the climbing mechanism 5 is arranged in the climbing space 39; the lifting portion 1 sleeves the guide rod 3; the guide rod 3 penetrates through the climbing space 39; the climbing mechanism 5 includes a climbing spring 40 and a climbing block 41 which sleeve the guide rod 3; two ends of the climbing spring 40 respectively press against a lower surface of the climbing block 41 and a bottom of the mounting space 32; the lifting portion 1 is provided with a fixed grip 42; the course adjustment grip 6 is hinged to the fixed grip 42; an inner end of the course adjustment grip 6 is exposed in the climbing space 39; the inner end of the course adjustment grip 6 is abutted against an upper surface of the climbing block 41; a clamping platform 43 is arranged at a top end of the lifting portion 1; the locking mechanism 7 includes a locking piece 44 and a locking spring 45 which sleeve the guide rod 3; one end of the locking piece 44 is clamped with the clamping platform 43; and two ends of the locking spring 45 are respectively abutted against the top end of the lifting portion 1 and a lower surface of the locking piece 44. The course adjustment grip 6 and the fixed grip 42 on the lifting portion 1 are hinged to each other. The arrangement of the fixed grip 42 makes it easier and more effortless for the user to press the course adjustment grip 6. Since the inner end of the course adjustment grip 6 is abutted against the upper surface of the climbing block 41, when the user presses the course adjustment grip 6, the climbing block 41 can be driven to tilt to be locked with the guide rod 3. In this case, if the user continues to press the course adjustment grip 6, the lifting portion 1 can be driven to move up along the guide rod 3 to jack the item. After the lifting portion 1 completes its upward movement, the locking spring 45 on the guide rod 3 can push the locking piece 44 to tilt to be locked with the guide rod 3, making it impossible for the lifting portion 1 to automatically move downwards. After completing the mounting of the item, the user can press the locking piece 44 to release the locked state between the locking piece 44 and the guide rod 3. In this case, the lifting portion 1 can quickly drop along the guide rod 3, and the lifting plate 4 on the lifting portion 1 can be separated from the item. A next item can be jacked.

The above embodiments are only preferred embodiments of the present disclosure, and do not limit the protection scope of the present disclosure. Therefore, any equivalent changes made on the basis of the structure, shape, and principle of the present disclosure shall all fall within the protection scope of the present disclosure.

What is claimed is:

1. A jacking tool capable of achieving up-down fine adjustment, comprising a fixed portion and a lifting portion (1) arranged on the fixed portion; a lifting plate (4), a climbing mechanism (5), and a course adjustment grip (6) for controlling the climbing mechanism (5) are movably connected to the lifting portion; wherein the fixed portion comprises a base (2) and a guide rod (3) arranged on the base (2); wherein the course adjustment grip (6) is pressed to actuate the climbing mechanism (5), to control the lifting portion (1) and the lifting plate (4) to simultaneously move up along the guide rod (3); the lifting portion (1) is further provided with a locking mechanism (7) clamped to the guide rod (3); the locking mechanism (7) restricts the lifting portion (1) from moving down; the lifting plate (4) is slidably arranged on the lifting portion (1);

an adjustment mechanism (8) is arranged between the lifting portion (1) and the lifting plate (4); and the adjustment mechanism (8) is actuated to control the lifting plate (4) to move up and down relative to the lifting portion (1), to achieve downward or upward fine adjustment on the lifting plate (4) relative to the lifting portion (1);

wherein the adjustment mechanism (8) comprises a threaded rod (9) and an actuation component; the lifting plate (4) is in threaded connection with the threaded rod (9); and when the actuation component drives the threaded rod (9) to rotate clockwise or anticlockwise, the lifting plate (4) in threaded connection to the threaded rod (9) moves up and down along the threaded rod (9).

2. The jacking tool capable of achieving up-down fine adjustment according to claim 1, wherein the lifting plate (4) is provided with a connection portion (10); a threaded hole (11) is provided in the connection portion (10); and the threaded rod (9) is arranged in the threaded hole (11) and is in threaded connection with the connection portion (10).

3. The jacking tool capable of achieving up-down fine adjustment according to claim 1, wherein the actuation component comprises a linkage bevel gear (12), an actuating bevel gear (13), and an actuating arm (14) arranged on the actuating bevel gear (13); the linkage bevel gear (12) is arranged on the threaded rod (9); the actuating bevel gear (13) is meshed with the linkage bevel gear (12); when the actuating arm (14) is actuated to rotate, the actuating bevel gear (13) is driven to rotate; the rotation of the actuating bevel gear (13) drives the linkage bevel gear (12) and the threaded rod (9) to rotate synchronously, to cause the lifting plate (4) to move up and down along the threaded rod (9).

4. The jacking tool capable of achieving up-down fine adjustment according to claim 3, wherein the actuation component further comprises a driven gear (15) and a driving gear (16) rotationally arranged on the lifting portion (1); two ends of the actuating arm (14) are respectively connected to the driven gear (15) and the actuating bevel gear (13); the driving gear (16) is meshed with the driven gear (15); and the driving gear (16) is connected to an actuator (17).

5. The jacking tool capable of achieving up-down fine adjustment according to claim 4, wherein a fixing hole (18) is provided in the lifting portion (1); an actuating hole (19) is provided in the driving gear (16); a rotating rod (20) is arranged in the actuating hole (19) and the fixing hole (18); connection holes (21) are provided in an inner end of the actuator (17); gear holes (22) are provided in the driving gear (16); and fixing rods (23) are arranged in the gear holes (22) and the connection holes (21).

6. The jacking tool capable of achieving up-down fine adjustment according to claim 5, wherein a position-limiting hole (24) is provided in the lifting portion (1); a position-lifting sleeve (25) is mounted inside the position-limiting hole (24); the actuating arm (14) is arranged in the position-lifting sleeve (25); a dust cap (26) is arranged on one side of the lifting portion (1); a transmission space is formed between the dust cap (26) and the position-lifting sleeve (25); the driven gear (15) and the driving gear (16) are arranged in the transmission space; a hole (27) for rotation corresponding to a position of the driving gear (16) is provided in the dust cap (26); and the inner end of the actuator (17) is arranged in the hole (27) for rotation.

7. The jacking tool capable of achieving up-down fine adjustment according to claim 1, wherein the lifting portion (1) is provided with a mounting hole (28); the lifting plate (4) is provided with an adjustment sliding chute (29); and the guide rod (3) is arranged in the mounting hole (28) and the adjustment sliding chute (29).

8. The jacking tool capable of achieving up-down fine adjustment according to claim 1, wherein a mounting block (31) is arranged at a bottom of the lifting portion (1); the mounting block (31) is fixedly connected to the lifting portion (1); a mounting space (32) is formed inside the lifting portion (1); a mounting portion (33) is arranged in the middle of the mounting block (31); the mounting portion (33) is located in the mounting space (32); a lower bearing (34) is arranged in the mounting portion (33); a bearing groove (35) is provided in a top in the mounting space (32); an upper bearing (36) is arranged in the bearing groove (35); the threaded rod (9) is arranged in the mounting space (32); an upper rotating portion (37) and a lower rotating portion (38) are respectively arranged at an upper end and a lower end of the threaded rod (9); the upper rotating portion (37) is connected to the upper bearing (36); and the lower rotating portion (38) is connected to the lower bearing (34).

9. The jacking tool capable of achieving up-down fine adjustment according to claim 1, wherein a climbing space (39) is arranged on the lifting portion (1); the climbing mechanism (5) is arranged in the climbing space (39); the lifting portion (1) sleeves the guide rod (3); the guide rod (3) penetrates through the climbing space (39); the climbing mechanism (5) comprises a climbing spring (40) and a climbing block (41) which sleeve the guide rod (3); two ends of the climbing spring (40) respectively press against a lower surface of the climbing block (41) and a bottom of the mounting space (32); the lifting portion (1) is provided with a fixed grip (42); the course adjustment grip (6) is hinged to the fixed grip (42); an inner end of the course adjustment grip (6) is exposed in the climbing space (39); the inner end of the course adjustment grip (6) is abutted against an upper surface of the climbing block (41); a clamping platform (43) is arranged at a top end of the lifting portion (1); the locking mechanism (7) comprises a locking piece (44) and a locking spring (45) which sleeve the guide rod (3); one end of the locking piece (44) is clamped with the clamping platform (43); and two ends of the locking spring (45) are respectively abutted against the top end of the lifting portion (1) and a lower surface of the locking piece (44).

* * * * *